Dec. 13, 1932.   S. B. BLAISDELL   1,891,211
BRAIDED PRODUCT AND PROCESS OF MAKING THE SAME
Filed July 1, 1932   3 Sheets-Sheet 1
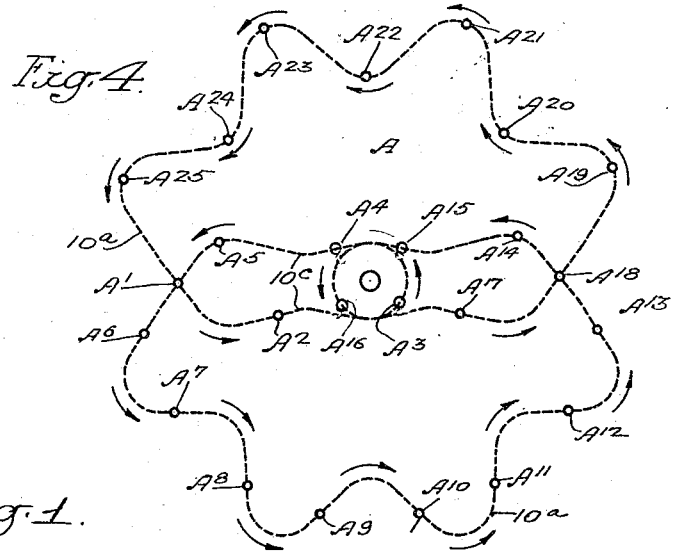
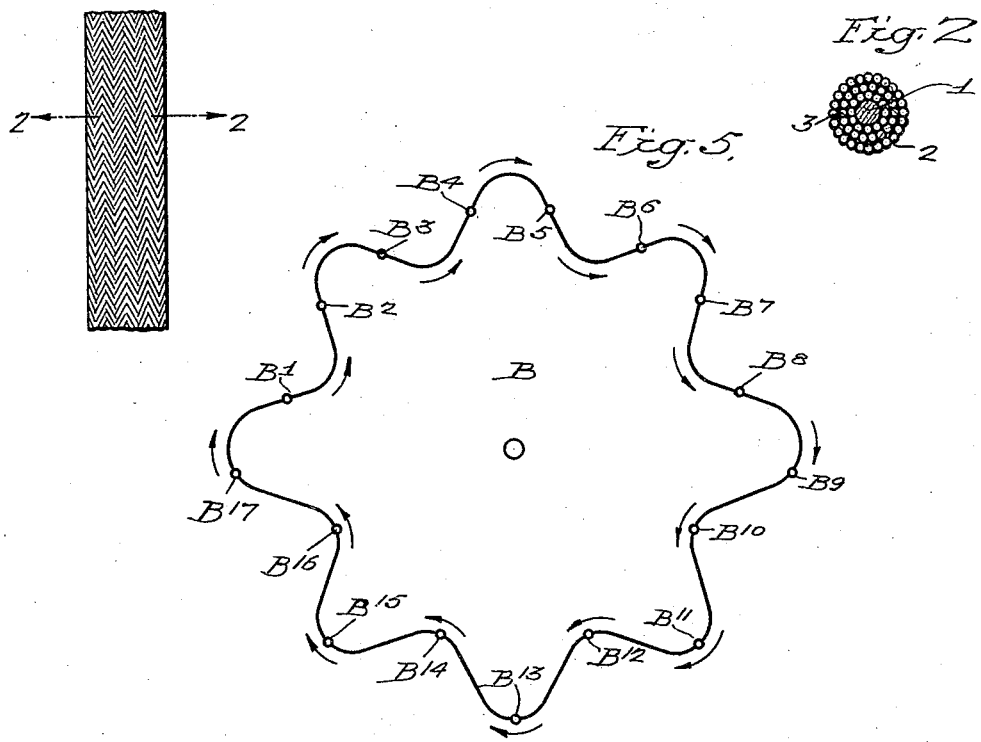
Inventor:
Sidney B. Blaisdell
by his Attorneys
Howson & Howson Dec. 13, 1932.     S. B. BLAISDELL     1,891,211
BRAIDED PRODUCT AND PROCESS OF MAKING THE SAME
Filed July 1, 1932     3 Sheets-Sheet 2

Inventor:
Sidney B. Blaisdell
by his Attorneys
Howson & Howson

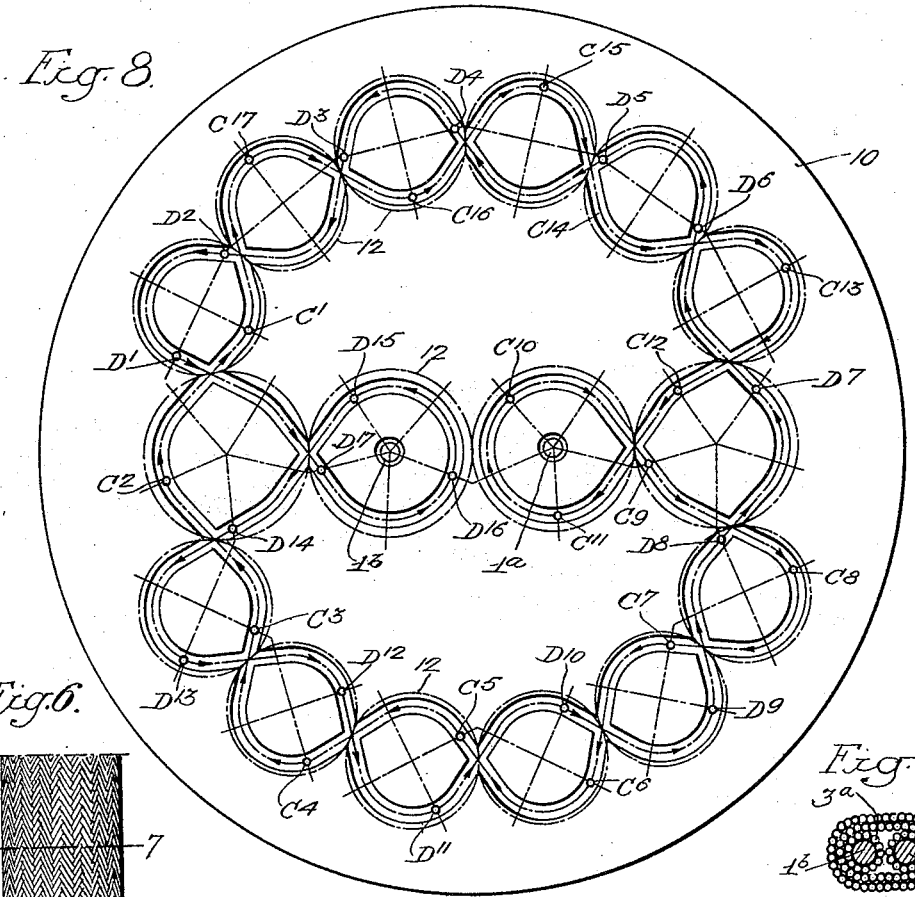

Patented Dec. 13, 1932

1,891,211

UNITED STATES PATENT OFFICE

SIDNEY B. BLAISDELL, OF WYNCOTE, PENNSYLVANIA, ASSIGNOR TO FIDELITY MACHINE COMPANY, OF PHILADELPHIA, PENNSYLVANIA, A CORPORATION OF DELAWARE

BRAIDED PRODUCT AND PROCESS OF MAKING THE SAME

Application filed July 1, 1932. Serial No. 620,501.

This invention relates to braided products, such as packing. The object of the invention is to build up a multilayer braided product in a single braiding operation by producing a plurality of layers of interbraided threads around one or more core threads simultaneously, and at the same time effecting a tying of the layers together and to the core threads, to prevent any relative longitudinal slippage therebetween.

The construction of the product and the process by which it is made will be fully disclosed hereinafter, reference being had to the accompanying drawings, of which:

Fig. 1 is a diagrammatic side view of a piece of packing made according to the principles of the present invention, and embodying a single core thread;

Fig. 2 is a diagrammatic cross-section taken on the line 2—2, Fig. 1;

Figure 3:
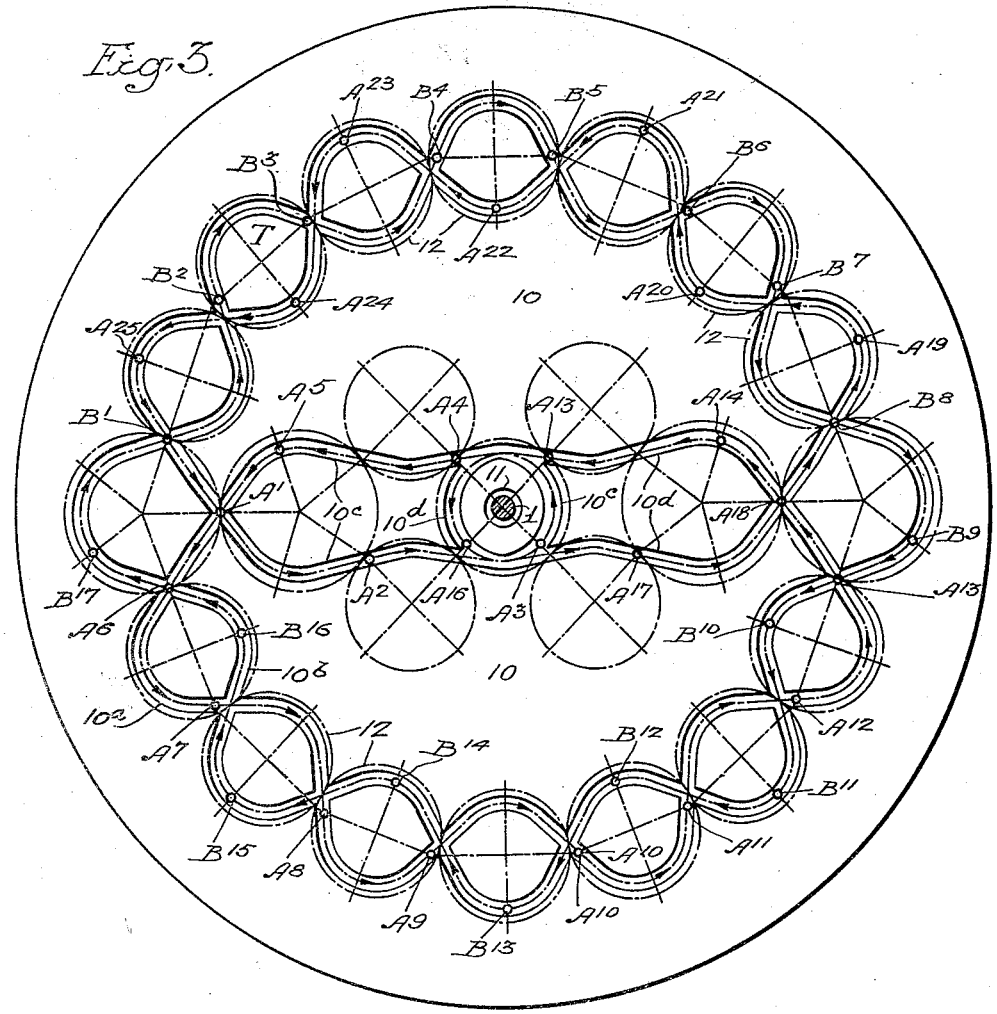
Fig. 3 is a diagrammatic plan view of the bobbin carrier table employed in making the packing shown in Figs. 1 and 2.

Figs. 4 and 5 diagrammatically illustrate the paths traversed by the two sets of bobbin carriers respectively;

Fig. 6 is a diagrammatic side view of a piece of packing having two core threads side by side;

Fig. 7 is a diagrammatic cross-section taken on the line 7—7, Fig. 6;

Fig. 8 is a diagrammatic plan view of the carrier table employed in making the packing shown in Figs. 6 and 7; and Figs. 9 and 10 illustrate diagrammatically the paths traversed by the two sets of bobbin carriers in producing the packing shown in Figs. 6 and 7.

In Figs. 1 and 2, the packing is illustrated as comprising a single core thread 1, around which is formed a plurality of layers 2 and 3, in the present instance composed of a plurality of interbraided threads divided into two series A and B. In the series A in the present illustration (see Figs. 3 and 4) there are twenty-five threads which are respectively drawn from bobbins and fed through thread guides supported by carriers $A^1$ to $A^{25}$ respectively. The series B in the present instance (see Figs. 3 and 5) comprises seventeen threads fed from bobbins and guides supported by carriers $B^1$ to $B^{17}$ inclusive, the carriers of the A series moving in a general counterclockwise direction, as viewed in Fig. 4, while the carriers of the B series move in a general clockwise direction, as viewed in Fig. 5, over the bobbin-supporting table 10 which is provided with intertwining serpentine paths $10a$ and $10b$ respectively.

The combined intertwining sepentine paths $10a$ and $10b$ are in the general form of a circle and as the carrier series A and B are moved in opposite directions through said paths the threads carried thereby are interbraided and form a generally tubular fabric in the center of which extends the core thread 1 which passes upwardly through an opening 11 in the center of the table 10 to the braiding point (not shown) of the machine located some distance above the table.

The carriers are moved over the table by the usual form of intermeshing horn gears diagrammatically illustrated at 12, the horns thereof engaging the carriers successively and moving them through the various undulations of the serpentine paths $10a$ and $10b$ to interbraid the threads of the series A with the threads of the series B to form the outer braided tube 2.

At one side of the table 10 the course traversed by the carrier series A passes inwardly from the above noted outer circle of undulations $10a$ in the form of a complete loop $10c$ which guides the carriers around one side of the center core thread 1.

At the opposite side of the table 10, the course traversed by the A series of carriers again passes inwardly from the said outer circular undulated course $10a$ in the form of a complete loop $10d$, whereby the carriers of the series A pass around the opposite side of the central core thread 1, and in so doing complete the intermediate layer 3, at the same time as the outer layer 2 is being braided. Thus, intermediate the outer interbraided layer of threads 2, as produced by the intertwining movements of the carriers of the series A and B in passing around the outer circular undulated courses $10a$ and $10b$, and the center core thread 1 is formed the intermediate layer of interbraided threads 3, the whole forming a composite multilayer product united at all points in a direction longitudinally thereof and from the core thread to the outerlayer in a direction transversely thereof.

The packing shown in Figs. 6 and 7, and in the process of construction in Figs. 8, 9 and 10, includes a pair of core threads $1a$ and $1b$, laid side by side throughout the length of the packing. In this instance, there are two series of thread carriers $C^1$ to $C^{17}$ and $D^1$ to $D^{17}$ inclusive.

The threads carried by the carriers $C^1$ to $C^{17}$ travel clockwise in a generally circular undulated path shown in Figs. 8 and 9, while the carriers $D^1$ to $D^{17}$ travel counterclockwise in a similar generally circular path shown in Figs. 8 and 10, the two paths intertwining as above noted to interbraid the threads of series C with the threads of series D to form the outer layer $2a$ of threads as shown in Fig. 7.

The threads controlled by the carriers of series C at one side of the table 10 pass into the interior of the generally tubular fabric and around the core thread $1a$ to form an inner layer $3a$ around the core thread $1a$ while the threads controlled by the carriers of series D pass into the interior of the tubular fabric at the opposite side of the table and around the core thread $1b$ to form an inner layer $3b$ around said core thread.

In each instance the opposed series of carriers traveling in opposite directions cause their respective threads to run at oppositely disposed diagonals to the length of the packing, as illustrated in Figs. 1 and 6, and due to the passage of the respective carriers from the outer circle of their pathways into an inner circle around the core threads the threads are laid in superposed layers around the core threads producing a multilayer braided product in a single braiding operation.

I claim:

1. A braided product comprising at least one core thread incased in a multilayer covering composed of a plurality of interbraided threads forming a complete tubular outer layer, with predetermined threads of said plurality passing into and out of the interior of the product at predetermined points circumferentially of said outer tubular layer and passing around a core thread within the product forming therein an intermediate layer between the said core thread and said outer layer.

2. A braided product comprising at least one core thread incased in a multilayer covering composed of a plurality of series of interbraided threads forming a complete tubular outer layer with at least one of said series of threads passing into and out of the interior of the product at predetermined points circumferentially of the outer tubular layer and passing around a core thread within the product forming therein an intermediate layer between the core thread and the said outer layer.

3. A braided product comprising at least one core thread incased in a multilayer covering composed of two series of interbraided threads extending in opposite directions and forming a complete tubular outer layer with the threads of at least one of said series passing into and out of the interior of the product at predetermined points circumferentially of the outer tubular layer and passing around a core thread within the product forming therein an intermediate layer between the core thread and the said outer layer.

4. A braided product comprising at least one core thread incased in a multilayer covering composed of two series of interbraided threads extending in opposite directions and forming a complete tubular outer layer with the threads of at least one of said series passing into and out of the interior of the product and crossing themselves at a plurality of predetermined points circumferentially of the outer tubular layer and passing completely around a core thread within the product forming therein an intermediate layer between the core thread and the said outer layer.

5. A braided product comprising at least one core thread incased in a multilayer covering composed of two series of interbraided threads extending in opposite directions and forming a complete tubular outer layer with the threads of at least one of said series passing into and out of the interior of the product and crossing themselves at diametrically opposed points of the outer tubular layer and passing completely around a core thread within the product forming therein an intermediate layer between the core thread and the said outer layer.

6. A braided product comprising a core thread incased in a multilayer covering composed of two series of interbraided threads extending in opposite directions and forming a complete tubular outer layer with the threads of one of said series passing into and out of the interior of the product and crossing themselves at diametrically opposite sides of said outer layer and completely passing around the core thread within the product forming therein an intermediate layer between the core thread and said outer layer.

7. A braided product comprising a pair of core threads incased in a multilayer covering composed of two series of interbraided threads extending in opposite directions and forming a complete tubular outer layer with the threads of each series passing into and out of the interior of the product and crossing themselves at one side of the outer layer in diametrically opposed relation to the other series, each series passing completely around a core thread of said pair within the product and forming an intermediate layer between its enclosed core thread and the said outer layer.

8. The method of making a braided product which consists in passing a plurality of threads through intertwining serpentine paths around at least one core thread to interbraid said threads into an outer tube, at predetermined points in their travel through said serpentine paths diverting predetermined threads of said plurality inwardly from said intertwining paths and around a core thread within said tube, and returning said diverted threads to said intertwining paths at the said points of diversion therefrom to form an intermediate thread layer between the tube and the core thread around which the diverted threads are passed.

9. The method of making a braided product which consists in passing a plurality of threads through intertwining serpentine paths around a core thread to interbraid said threads into an outer tube, at each of a pair of diametrically opposed points of said intertwining paths diverting predetermined threads from said paths inwardly and around said core thread, and returning said diverted threads to said intertwining paths at the said points of diversion therefrom to form an intermediate thread layer between the core thread and the tube.

10. The method of making a braided product which consists in passing a plurality of threads through intertwining serpentine paths around a plurality of parallel core threads to form an outer tube around said plurality of core threads at points adjacent each core thread in the travel of said plurality of threads through said intertwining paths diverting predetermined threads of said plurality from said paths inwardly and around a core thread adjacent a point of diversion and returning the diverted threads to said intertwining paths at the said points of diversion therefrom to form individual intermediate thread layers between each of said core threads and the outer tube.

SIDNEY B. BLAISDELL.